(12) United States Patent
Weidinger

(10) Patent No.: US 7,172,060 B2
(45) Date of Patent: Feb. 6, 2007

(54) PRESSURE PLATE ASSEMBLY

(75) Inventor: Reinhold Weidinger, Kolitzheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/879,293

(22) Filed: Jun. 29, 2004

(65) Prior Publication Data
US 2005/0006194 A1  Jan. 13, 2005

(30) Foreign Application Priority Data
Jul. 9, 2003 (DE) ................. 103 30 880

(51) Int. Cl.
F16D 13/75 (2006.01)

(52) U.S. Cl. ................. 192/70.25; 192/111 A

(58) Field of Classification Search ............. None
See application file for complete search history.

(56) References Cited

U.S. PATENT DOCUMENTS

| 4,207,972 | A |   | 6/1980  | Zeidler        |           |
|-----------|---|---|---------|----------------|-----------|
| 5,377,803 | A | * | 1/1995  | Link et al.    | 192/111 A |
| 5,409,091 | A |   | 4/1995  | Reik et al.    |           |
| 5,469,760 | A | * | 11/1995 | Kamio          | 192/111 A |
| 5,641,048 | A | * | 6/1997  | von Gaisberg   | 192/70.25 |
| 5,695,036 | A | * | 12/1997 | Gochenour et al. | 192/70.25 |
| 5,988,338 | A | * | 11/1999 | Maucher        | 192/70.25 |
| 6,021,877 | A |   | 2/2000  | Weidinger et al. |         |
| 6,109,412 | A | * | 8/2000  | Cole et al.    | 192/70.25 |
| 6,533,094 | B2 | * | 3/2003 | Uehara et al.  | 192/70.25 |
| 2003/0141163 | A1 | * | 7/2003 | Doremus et al. | 192/70.25 |

FOREIGN PATENT DOCUMENTS

DE          101 55 146          9/2002

* cited by examiner

Primary Examiner—Rodney H. Bonck
(74) Attorney, Agent, or Firm—Cohen Pontani Lieberman & Pavane LLP

(57) ABSTRACT

A pressure plate assembly, comprising a housing; a pressure plate, which is installed in the housing and which is connected by a connecting arrangement to the housing so that it can rotate in common with the housing around an axis of rotation (A) and also move in the direction parallel to the axis of rotation (A); a force-exerting arrangement, which is supported against the housing and the pressure plate, by means of which arrangement force can be exerted on the pressure plate to produce an engaged state; and a wear take-up device with at least one adjusting element, which is under the pretensioning force of a pretensioning arrangement so that adjusting movements can be carried out, characterized in that a blocking arrangement is provided, which can act on the adjusting element, where, as a function of centrifugal force, the blocking arrangement either releases the adjusting element completely or to a limited, predetermined extent so that an adjusting process can be carried out or completely prevents any such adjusting movement.

16 Claims, 5 Drawing Sheets

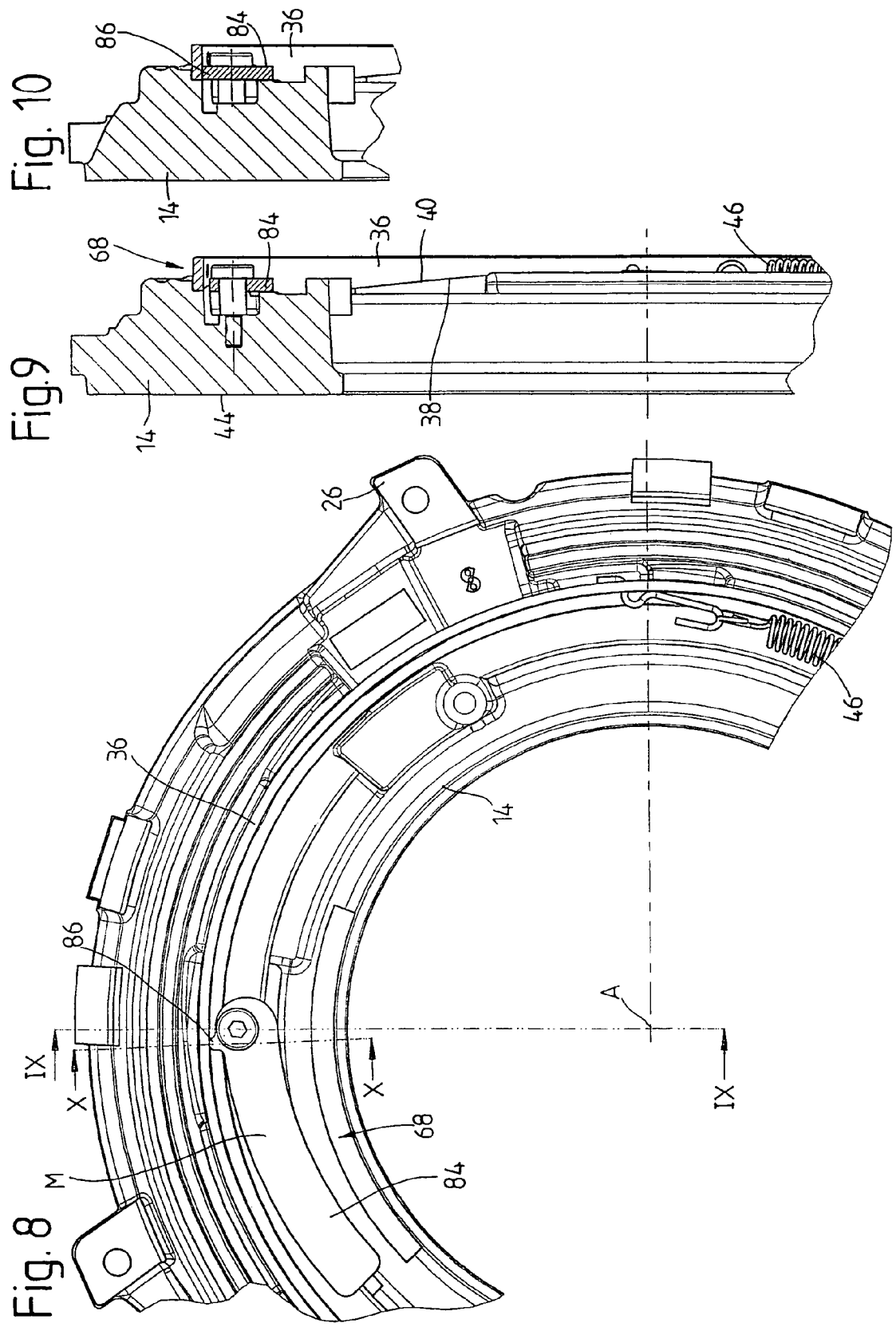

PRESSURE PLATE ASSEMBLY

BACKGROUND OF THE INVENTION

1. Field of the Invention

The present invention pertains to a pressure plate assembly of the type including a housing; a pressure plate, which is installed in the housing and which is connected by a connecting arrangement to the housing so that it can rotate in common with the housing around an axis of rotation and also move in the direction parallel to the axis of rotation; a force-exerting arrangement, which is supported against the housing and the pressure plate, by means of which arrangement force can be exerted on the pressure plate to produce an engaged state; and a wear take-up device with at least one adjusting element, which is under the pretensioning force of a pretensioning arrangement so that adjusting processes can be carried out.

2. Description of the Related Art

A pressure plate assembly of this type, which is used in friction clutches for motor vehicles, is known from U.S. Pat. No. 4,207,972. In this known pressure plate assembly, the wear take-up device comprises a ring-like adjusting element, which is pretensioned by the force of a pretensioning spring to rotate in the circumferential direction. Complementary ramp surfaces are provided on the adjusting element and on the pressure plate, so that, when the adjusting element rotates, its ramp surfaces slide over the complementary ramp surfaces of the pressure plate. As a result, the area on the adjusting element which contacts an energy-storage device is shifted in the axial direction with respect to the pressure plate. It is possible in this way to compensate for the wear which occurs during operation. That is, when a clutch-release operation is performed, the pressure plate, upon which a releasing force-producing arrangement acts, first follows along with the clutch-release movement of the energy-storage device but then stops when a release distance-limiting arrangement goes into effect. The energy-storage device thus has no more actuating effect even though its release movement continues. The wear take-up process continues until the adjusting element comes to rest again on the energy-storage device, which is held in its released position.

These types of pressure plate assemblies, which are used primarily in trucks, lead during operation to the problem that, during the time that the pressure plate is pretensioned for at least a certain period by the releasing force-producing arrangement against the energy-storage device during a clutch-release operation, impacts can cause the pressure plate to move in the axial direction; this axial movement moves the pressure plate against the force of the releasing force-producing arrangement and thus away from the energy-storage device. This can occur, for example, when a truck is driving in reverse and hits a loading ramp. The result is that the clamping effect is briefly released, and an undesired wear take-up adjustment can thus occur in the pressure plate assembly. The energy-storage device will then assumes a more-or-less undefined position.

SUMMARY OF THE INVENTION

The task of the present invention is to improve the design of the pressure plate assembly of the general type in question so that the danger of unsuitable take-up adjustments is avoided.

According to the invention, a blocking arrangement which can act on the adjusting element is provided, where, as a function of centrifugal force, the blocking arrangement either releases the adjusting element completely or to a limited, predetermined extent so that an adjusting process can be carried out or completely prevents any such adjusting movement.

As a result of the blocking arrangement in accordance with the invention, an adjusting movement in the pressure plate assembly can occur only under defined conditions, which depend on centrifugal forces. When the centrifugal force acting on the blocking arrangement during the rotation of the pressure plate assembly exceeds a certain value, the blocking arrangement essentially either completely prevents the adjusting element from performing an adjusting operation or allows the adjusting element to perform an adjusting movement only to a limited, predetermined extent. The wear take-up device or the minimum of one wear take-up element of that device is therefore released to perform an adjusting process only when the vehicle is stopped and the pressure plate assembly is not turning and thus also when the occurrence of impacts or the like is not to be expected and when, in this state, the clutch is shifted in the disengaging direction. As an alternative, it is also possible to use the blocking arrangement in the inventive pressure plate assembly to limit the adjusting processes which may possibly occur under undefined conditions such as in the presence of oscillations of the pressure plate, so that even in this case the installation position of the force-exerting arrangement will still remain defined.

For example, the blocking arrangement can include at least one blocking element, which can be brought by centrifugal force into blocking interaction with the adjusting element and which can then be brought by a restoring force out of this blocking interaction with the adjusting element. So that the change in direction toward the deactivated, i.e., non-blocking, position can be produced in a defined manner, it is proposed that the restoring force be provided by a restoring spring, which acts on the blocking element. Alternatively or in addition, it is also possible for the restoring force to be provided by the force of gravity.

To achieve a secure, stable blocking state, it is proposed that a set of teeth pointing in the adjusting direction of the adjusting element be provided on the adjusting element or on the minimum of one blocking element. The cooperating element can be brought into blocking engagement with these teeth to produce the blocking state, possibly after the adjusting element has moved in the adjusting direction.

In the pressure plate assembly according to the invention, a release distance-limiting arrangement can be provided so that the pressure plate can be moved in a defined manner in the disengaging direction. This arrangement limits the distance which the pressure plate can travel during a clutch-release operation. The release distance-limiting arrangement allows the pressure plate to travel a release distance which is essentially independent of the state of wear. For example, it is possible for the release distance-limiting arrangement to have a stop element, which is carried on the housing and which can be shifted with respect to the housing by the action of a force, and a driver element, which is permanently connected to the pressure plate and which shifts the stop element relative to the housing when wear occurs.

So that this defined and limited release movement of the pressure plate can be achieved, it is proposed that a releasing force-producing arrangement be provided, by means of which the pressure plate is subjected to a releasing force, which acts in opposition to the actuating effect of the force-exerting arrangement. In an embodiment which is especially easy to realize, the connecting arrangement can constitute the releasing force-producing arrangement.

So that undefined take-up adjustments can also be prevented in the transition state between a completely engaged and a completely disengaged position of the pressure plate, it is proposed that, in the presence of the releasing force and the actuating force of the force-exerting arrangement, the pretensioning effect provided by the pretensioning arrangement be insufficient to cause the adjusting element to perform a take-up adjustment.

So that the extent of the take-up adjustments made after the occurrence of wear can be defined, it is also advantageous for a release distance-limiting arrangement to be provided for the force-exerting arrangement to limit the distance which that arrangement can travel during the performance of a clutch-release operation. For example, in an embodiment which is especially easy to realize, it is possible for the release distance-limiting arrangement to be formed by the housing.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 8 is a partial axial view similar to FIG. 6 of an alternative embodiment;

FIG. 9 is a cross-sectional view of the pressure plate of FIG. 8 along line IX—IX; and FIG. 10 is a cross-sectional view the pressure plate of FIG. 8 along the line X—X.

DETAILED DESCRIPTION OF THE PRESENTLY PREFERRED EMBODIMENTS

Figure 1:
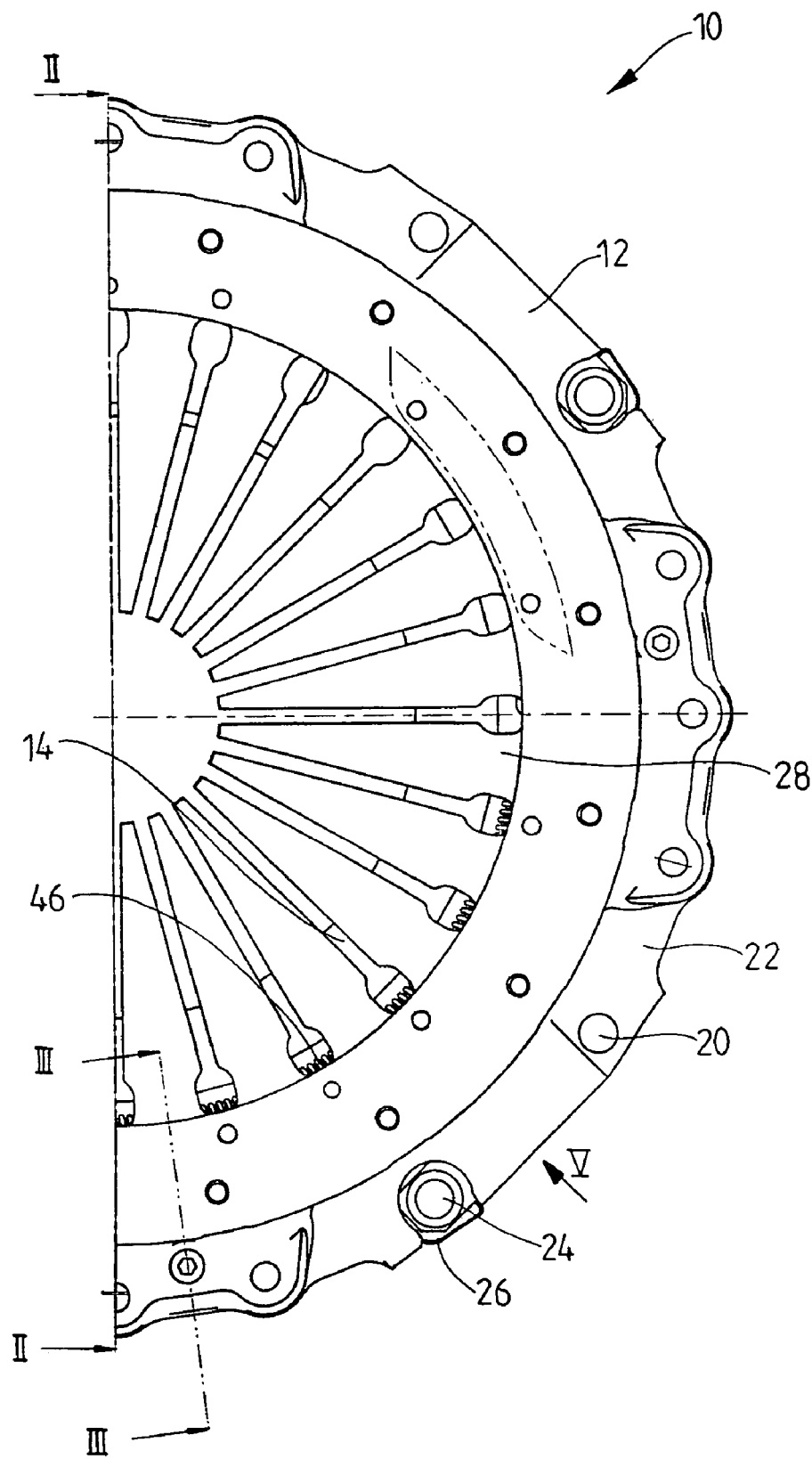
FIG. 1 is a partial axial plan view of a pressure plate assembly according to the invention.
Figure 2:
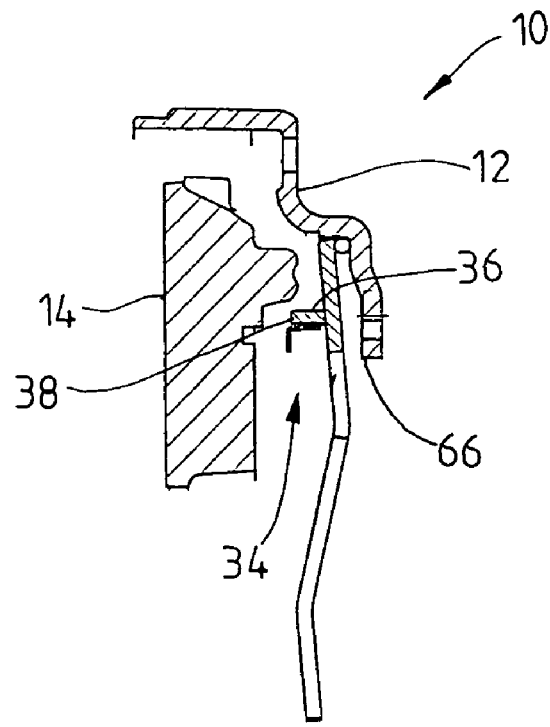
FIG. 2 is a cross-sectional view of the pressure plate assembly shown in FIG. 1 along line II—II.
Figure 2:
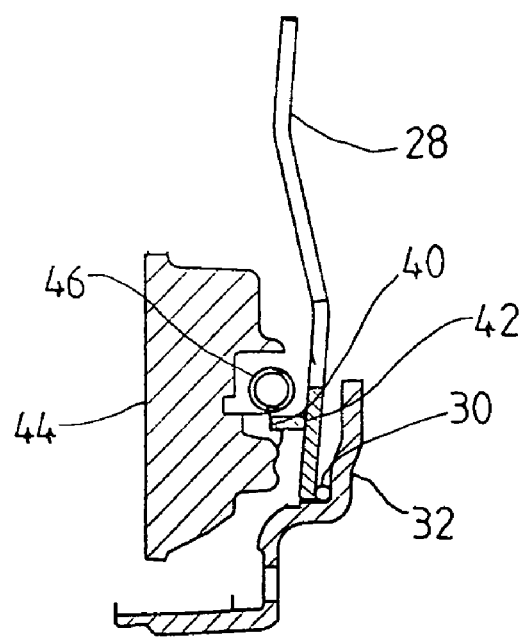
Figure 3:
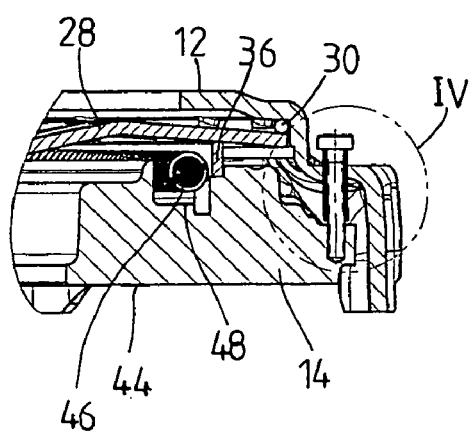
FIG. 3 is a partial cross-sectional view of the pressure plate assembly of FIG. 1 along line III—III.

The pressure plate assembly 10, the essential components of which are shown in FIGS. 1 and 2, comprises an essentially cup-like housing 12, which is designed to be permanently connected to a flywheel arrangement. In this cup-like housing 12, a pressure plate 14 is provided, which can rotate together with the housing 12 around an axis of rotation A, but which can also move to a limited extent relative to the housing 12 in the direction parallel to the axis of rotation A.

Figure 5:
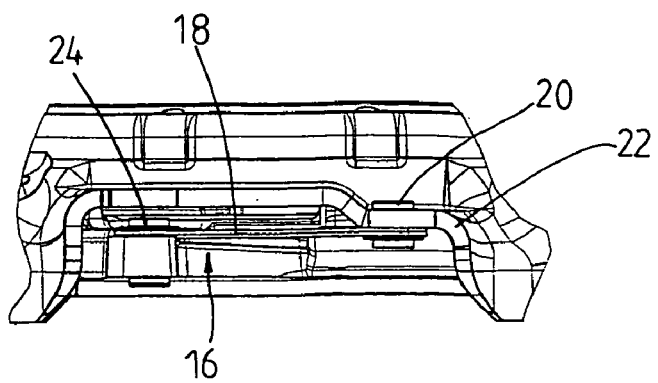
FIG. 5 is a partial radial elevation view of the pressure plate assembly shown in FIG. 1 from the viewing perspective marked V.

So that this connection between the housing 12 and the pressure plate 14 can be achieved, a connecting arrangement 16, as shown in FIG. 5, can be provided. This can comprise several tangential leaf springs 18 or the like, distributed circumferentially around the axis of rotation; one circumferential end of each spring is fastened by a clinch bolt 20 to a radially outward-pointing flange-like section 22 of the housing 12, whereas the other circumferential end is fastened by a clinch bolt 24 to a radially outward pointing arm section 26 of the pressure plate 14. By means of these tangential leaf springs 18 or the connecting arrangement 16 embodied thereby, it is also possible simultaneously to realize a releasing force-producing function, which pretensions the pressure plate 14 in the disengaging direction, that is, toward the right in the diagram according to FIG. 2 and in the direction away from the flywheel arrangement (not shown).

So that the pressure plate 14 can be moved in the engaging direction, a force-exerting arrangement in the form of an energy-storage device 28, such as a device built in the manner of a diaphragm or Belleville spring, is provided. In the example shown, this energy-storage device 28 is supported in its radially outermost area by a wire ring 30 or the like against a bottom area 32 of the housing 12. So that disengaging operations can be carried out, it is possible to exert a pulling force on the radially inner area of the energy-storage device 28. Between the radially outer area and the radially inner area, the energy-storage device 28 acts by way of a wear take-up device 34 on the pressure plate 14 to subject it to a force in the engaging direction, that is, toward the left in the diagram according to FIG. 2 and thus in opposition to the releasing force, which is provided by the connecting arrangement 16 and which is much weaker than the engaging force provided by the energy-storage device 28.

In the example shown here, the wear take-up device 34 comprises an adjusting ring 36. On the side facing away from the pressure plate 14, the adjusting ring 36 is subjected to the force of the energy-storage device 28. On the side facing the pressure plate 14, the adjusting ring 36 has several ramp surfaces 38 arranged around the circumference; these ramp surfaces face complementary ramp surfaces 40 on the pressure plate 14. By rotation of the adjusting ring 36 with respect to the pressure plate 14 in an adjusting direction around the axis of rotation A, the ramp surfaces 38, 40 slide over each other, which has the result that the contact area 42 of the adjusting ring for the energy-storage device 28 shifts axially with respect to the pressure plate 18 in such a way that the distance from the friction surface 44 provided on the pressure plate 14 increases. So that the adjusting ring can rotate in this way, at least one pretensioning spring 46 is provided, one end of which acts on the adjusting ring 36, while the other acts on the pressure plate 14. The pretensioning force of this spring is thus oriented in such a way as to rotate the adjusting ring. This spring 46 can be a helical tension spring, for example, which can be held in a recess 48 in the pressure plate 14 so that it will assume a circumferential orientation.

A release distance-limiting arrangement 50 (FIG. 4) is also assigned to the pressure plate 14. This arrangement includes a sleeve-like stop element 52 in at least one circumferential position on the housing 12. The longitudinal axis of this sleeve is essentially parallel to the axis of rotation A; the sleeve is thus held in the opening 54 in the housing 12 so that it is oriented in the same direction as that in which the pressure plate 14 shifts. The outer diameter of this sleeve-like stop element 52 and the inside diameter of the opening 54 are coordinated in such a way that the stop element 52 is held in a friction-locking manner in the housing 12 and can be pushed relative to the housing 12 in the direction parallel to the axis of rotation A by the action of a defined force. For this purpose, it is possible, for example, for the sleeve-like stop element 52 to be made out of sheet or spring steel material with the tendency to expand in the radially outward direction, an axial slot being provided at a certain point on the circumference to allow this expansion. It is also possible in principle to use a tubular plastic element or the like, which is slightly oversized with respect to the inside diameter of the opening 54. The axial end area 56 of the stop element 52 in the housing 12 forms an axial stop for the pressure plate 14 when the plate moves in the disengaging direction, the pressure plate 14 thus being prevented from traveling any farther in this direction. With respect to the frictional interaction between the stop element 52 and the housing 12, care should be taken to ensure that the releasing force provided by the connecting arrangement 16 or by some other releasing force-producing arrangement is not strong enough to shift the stop element 52 or possibly several such elements with respect to the housing 12.

The release distance-limiting arrangement 50 also includes a driver element 58, which can be designed, for example, as a stud bolt. The shaft area 60 of this bolt passes through the sleeve-like stop element 52 and is fastened to the pressure plate 14 by screwing, a press-fit, adhesive bonding, etc. The head area 62 of the driver element 58, which is situated outside the housing 12 and thus also outside the stop element 52, grips the end area 64 of the stop element 52 situated outside the housing 12. The dimensions of the stop element 52 and of the section of the shaft 60 of the driver element 58 between the pressure plate and the head area 52 are coordinated in such a way that the driver element 58 and thus also the pressure plate 14 are able to execute axial movement relative to the stop element 52 equal to the maximum release clearance L.

Figure 4:
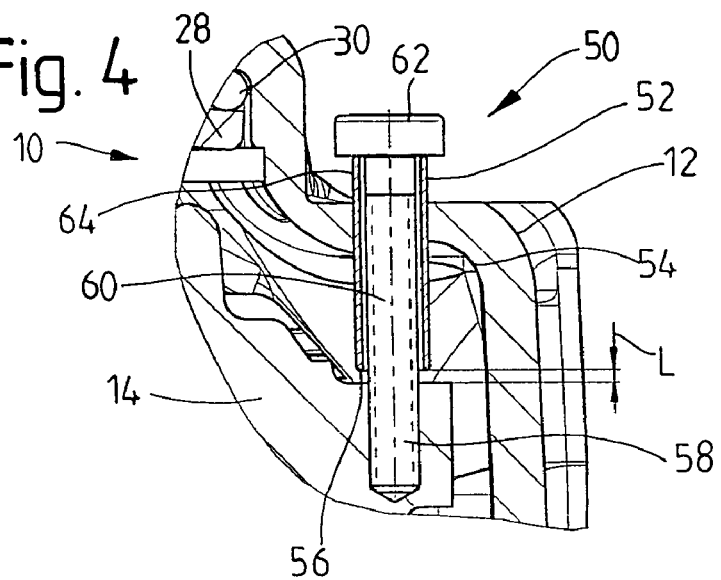
FIG. 4 is an enlarged view of the detail inside the circle marked IV in FIG. 3.

FIG. 4 shows by way of example the completely engaged state of the pressure plate 14, i.e., of the pressure plate assembly 10, in which the pressure plate 14 is at the maximum distance L away from the end area 56 of the stop element 52, whereas the head area 62 of the driver element 58 rests on the end area 64. If, proceeding from this state, the assembly is now to be disengaged, a force is exerted on the radially inner area of the energy-storage device 28, i.e., a force which moves the radially inner area away from the flywheel arrangement, so that the pressure plate 14, under the action of the connecting arrangement 16, now shifts axially, following the movement of the energy-storage device 28, in the disengaging direction. As this happens, the head area 62 rises from the end area 64 of the stop element 52, whereas the pressure plate 14 approaches the end area 56, and, upon reaching it, is prevented from moving any farther in the axial direction.

A release movement stop 66 for the energy-storage device 28 is also provided on the housing 12, as shown in FIG. 2. The movement of the energy-storage device can also be limited by the contact of the actuating system such as a releasing device with a wall of the gearbox. The spring travel of the energy-storage device can also be limited by the insertion of intermediate elements between, for example, the energy-storage device and the housing. By the exertion of a pulling force on the radially inner area of the energy-storage device 28, this area approaches the release movement stop 66, until it makes actual contact with it and then can no longer be moved. When the assembly is new or before wear has occurred or when the assembly is in a state in which the wear has been compensated, this contact between the energy-storage device 28 and the release movement stop 66 occurs precisely at the same moment that the pressure plate 14 comes into contact with the end area 56 of the stop element 52. This means that the pressure plate 14 and the energy-storage device 28 are prevented from moving any farther in the disengaging direction at approximately the same time. In this way, it is ensured that the tangential leaf springs 18 continue to hold the wear take-up device 34, i.e., the adjusting ring 36 of that device, in a defined position between the energy-storage device 28 and the pressure plate 14, because the releasing force provided by these tangential leaf springs 18 is so strong that the pretensioning force provided by the pretensioning spring 28, which acts on the adjusting ring 36, is unable to rotate this ring in the adjusting direction.

When, in the case of a friction clutch with this type of pressure plate assembly 10, the friction linings of a clutch disk (not shown), for example, become worn, the pressure plate 14 must move slightly farther in the direction toward the flywheel arrangement and in the direction away from the housing 12 when a clutch-engaging operation is performed. The result of this is as follows: as a result of the contact between the head area 62 of the driver element 58 and the end area 64 of the stop element 52, the stop element 52 shifts axially with respect to the housing 12 because of the axial movement of the pressure plate 14, which, as a result of wear, now continues to travel under the action of the force exerted by the energy-storage device 28 until the pressure plate 14 arrives in the engaged state and no further axial movement relative to the housing 12 occurs. What is present now in the engaged state is precisely the same state as that shown in FIG. 4, in which the release clearance L is present between the end area 56 of the stop element 52 and the pressure plate 14. In this case, however, the stop element 52 itself has been shifted slightly in the axial direction in comparison with the original or previous state.

When the clutch is now disengaged again by a subsequent exertion of a pulling force on the energy-storage device 28, the pressure plate 14 initially follows along again with the releasing movement of the energy-storage device 28 under the action of the tangential leaf springs 18. But before the energy-storage device 28 makes contact with the release distance-limiting stop 66, which has been unchanged by the wear, the pressure plate 14 makes contact with the end area 56 of the stop element 52 and is no longer able to follow the further disengaging movement of the energy-storage device 28. The result is that now the pressure plate 14 is pretensioned by the tangential leaf springs 18 against the stop elements 52, whereas the energy-storage device 28 now loses its actuating effect as it continues to move in the disengaging direction. This is the state in which the adjusting ring 36 can now rotate in the circumferential direction under the effect of the pretensioning spring 28; the contact area 42 can remain in the contact with the energy-storage device 28 because of the axial shift of that area which occurs during the circumferential rotation. The rotation of the adjusting ring 36 continues until the energy-storage device 28 makes contact with the release movement stop 66 and can no longer be moved. In this way, the wear which was detected previously by the axial shift of the stop element 52 during a clutch-engaging operation is compensated.

Figure 7:
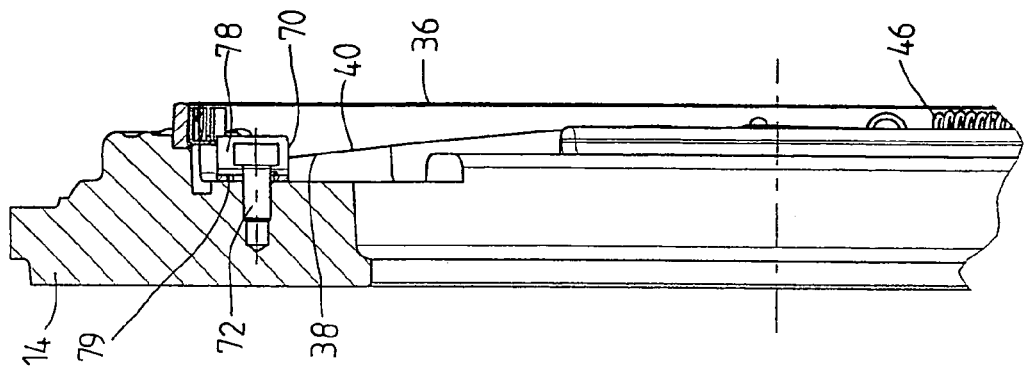
FIG. 7 is a cross-sectional view of the pressure plate of FIG. 6 along the line VII—VII.
Figure 6:
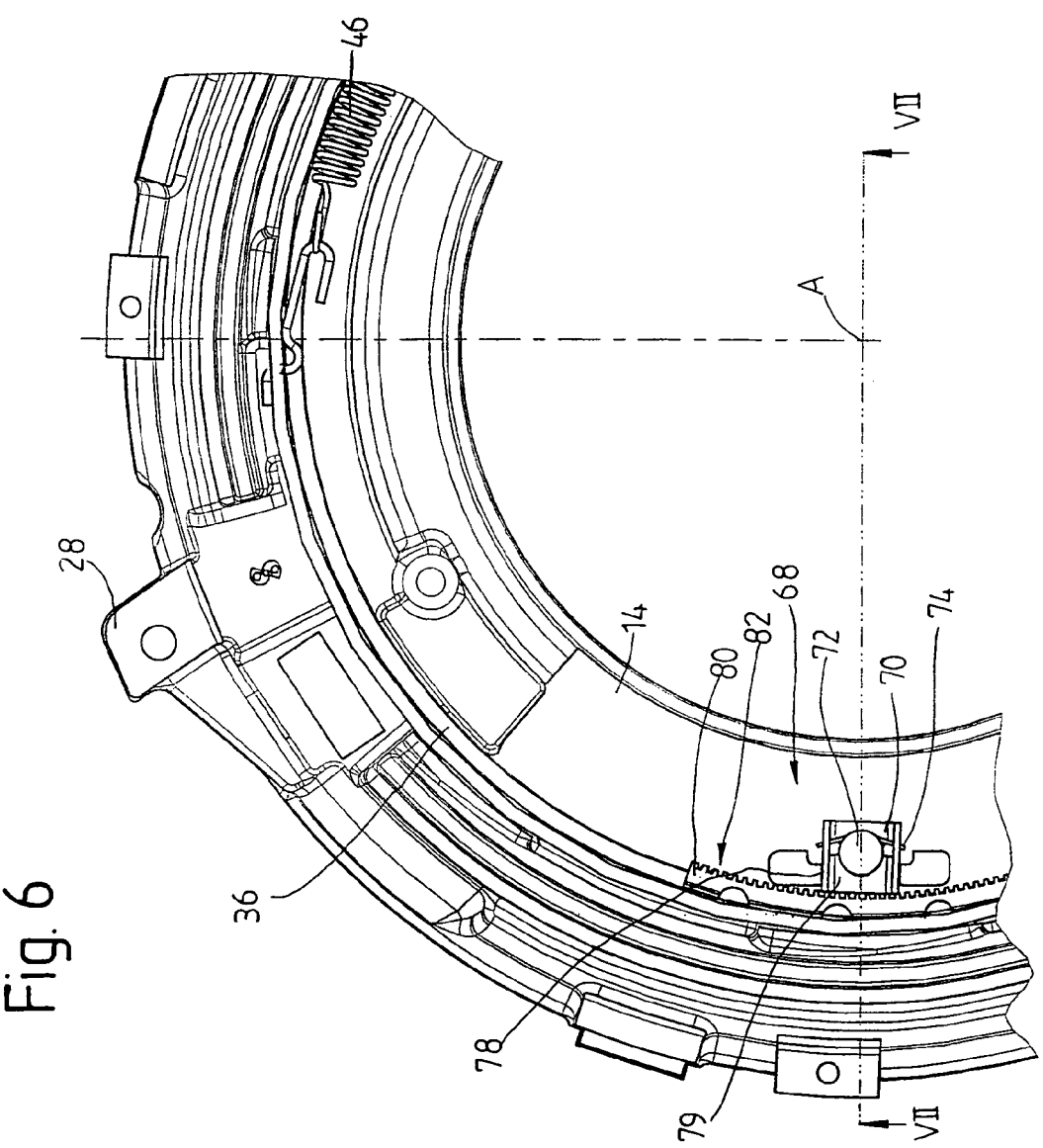
FIG. 6 is a partial axial view of the pressure plate used in the pressure plate assembly of FIG. 1 with its wear take-up device.

It can be seen from the preceding explanation that states occur in which, because the pressure plate 14 is not or is not yet completely engaged and is not yet pressing against the friction linings of a clutch disk, etc., the wear take-up device 34 is prevented from performing adjusting operations only because the adjusting ring 36 is clamped primarily by the force exerted by the tangential leaf springs 18 between the energy-storage device 28 and the pressure plate 14. When, in this state, vibrations or impacts occur, which lead to an axial oscillation or movement of the pressure plate 14, the increase in the axial gap which occurs at least for a brief period between the pressure plate and the energy-storage device 28 can allow the adjusting movement 34 for the take-up operation to occur. This, however, would lead to incorrect and undefined wear take-up. To counter this problem, a blocking arrangement 68, which is shown in FIGS. 6 and 7, is provided in the inventive pressure plate assembly 10. This blocking arrangement 68 comprises at least one blocking element 70, assigned to the adjusting ring 36. So that it can move in the radial direction with respect to the axis of rotation A, this blocking element is guided by a bolt 72 provided on the pressure plate 14. The bolt is pretensioned in the radially inward direction by a pretensioning spring 74, which acts between the bolt 72 and the blocking element 70. It can be seen that the blocking element 70 can be designed in the form of a "U", so that the spring 74, designed as a leaf spring, etc., can be supported against the sidepieces 76, 78 of the "U", whereas the bottom area 79 of the connecting element 70 is guided by the bolt 72 so that it can move in the radial direction.

A set of teeth 82 is provided on the adjusting ring 36, either as an integral part of the ring or as a separate element 80 attached to it. This set of teeth 82 extends in the circumferential direction, that is, in the direction in which the wear take-up movement of the adjusting ring 36 occurs, and is located in the area of the blocking element 70. The pitch of the teeth 83 is such that, when the blocking element 70 moves radially outward, its U-sidepieces 78 can engage in the gaps between the teeth 83. In this state, i.e., a state in which the blocking element 70 is therefore engaged with the set of teeth 82, the fact that the blocking element 70 cannot move in the circumferential direction 82 means that the adjusting ring 36 is not free to rotate either.

The way in which the blocking arrangement 68 works is described below. It is obvious that the arrangement can have several blocking elements 70, each with its own assigned set of teeth 82, distributed around the circumference.

As long as the pressure plate assembly 10 is not rotating around the axis of rotation A, e.g., as along as the vehicle remains turned off, the blocking element 70 is not in blocking engagement with the set of teeth 82, so that in principle the adjusting ring 36 would be able to rotate in the adjusting direction. When the assembly is rotating, i.e., for example, when the drive unit is operating at idle, the centrifugal force present is sufficient to shift the blocking element 70 radially outward against the force of the spring 74. If the rotational positioning of the adjusting ring 36, i.e., of the set of teeth 82, in this state is such that the U-sidepieces 76, 78 of the blocking element 70 can engage in the gaps between the teeth 83 of the set of teeth 82, then, even if wear occurs thereafter and the previously described movements occur, the adjusting ring 36 still cannot rotate in the circumferential direction to perform an adjusting movement and no wear take-up will occur. The blocking element 70 will move back into the released state, in which it is no longer engaged with the set of teeth 82, only after the system has been stopped again and, for example, the rpm's fall below a certain limit value, which can be lower than the rpm's at idle, and the centrifugal force therefore decreases correspondingly. When in this state the clutch is actuated in the disengaging direction by a clutch pedal or a clutch actuator, and the wear which had not been previously compensated will now be compensated in the manner described above.

If, when the system starts to rotate again and a certain threshold rpm value or threshold centrifugal force is exceeded, the circumferential positioning of the set of teeth 82 is such that the U-sidepieces 76, 78 are overlapped at least partially by the teeth 83 facing them, the blocking element 70 will not be able to engage with the teeth, even though it is pretensioned or actuated by centrifugal force in this direction. The set of teeth 82 will move in the circumferential direction only after the wear take-up device 34, i.e., the adjusting ring 36, can execute an adjusting movement in the manner described above either because of the actual occurrence of wear or because of a brief axial oscillation of the pressure plate, and the teeth will continue to move in that direction until the U-sidepieces 76, 78 of the radially outward-pretensioned blocking element 70 engage in the next set of gaps between the teeth 83. If this circumferential movement of the adjusting ring 36 was induced by wear, this wear has now been at least partially compensated. After the system has been stopped and then started again, the blocking element 70 will engage immediately with the set of teeth 82 because the adjusting ring 36 will not have rotated any farther, and the blocking element will now prevent the adjusting ring 36 from rotating until the system has been stopped again.

If the circumferential movement of the adjusting ring 36 was induced or made possible not by wear but rather by an axial oscillation of the pressure plate 14, the circumferential movement of the adjusting ring 36 which has occurred must actually be considered overcompensation. In accordance with the present invention, however, this is still to be considered a defined form of compensation, because the adjusting movement of the adjusting ring 36 is defined and limited to a certain range, and thus the extent of this wear compensation is known. The result is that, the next time the clutch is disengaged while the system is operating, the distance between the pressure plate and the end area 56 of the stop element 52 reached when the energy-storage device 28 makes contact with the stop 66 will correspond to the overcompensation. The stop element 52 will not shift axially in successive stages as previously described and thus the situation in which the pressure plate 14 rests against the end area 56 will not be reached again until additional wear has occurred during the following period of operation and the energy-storage device 28 has also come to rest against the stop 66. As the amount of wear continues to increase, the stop element 52 will continue to shift in the axial direction, but at first no wear take-up is possible, because, as a result of centrifugal force, the blocking element 70 is still engaged with the set of teeth 82. Before enough wear has occurred to require compensation, the adjusting ring 36 will not have moved in the circumferential direction. Therefore, whenever the system is shut down and the absence of sufficient centrifugal force allows the blocking element 70 to disengage from the set of teeth 82, the blocking element 70 will always engage immediately with the set of teeth 82 when the system is restarted and centrifugal force pushes the blocking element 70 radially outward again. If enough wear has occurred to require compensation, this take-up adjustment will occur when the system is shut down or the rpm's fall below the limit value and the friction clutch is released. Under these conditions, the adjusting ring 36 is free to move in the take-up direction.

It can be seen from the preceding description that, as a result of the blocking arrangement 68 provided according to the invention, it is ensured either that the wear take-up device 36 can compensate for wear only under conditions in which no undefined states are likely to occur, i.e., while the system is practically unmoving, or that the wear take-up device 34 is allowed to make only a limited take-up movement, which can be associated with a certain overcompensation, also to a defined extent. During the subsequent operation of the clutch, this degree of overcompensation is then "used up" again, until another wear take-up process can be performed.

An alternative embodiment of the inventive blocking arrangement 68 is shown in FIGS. 8–10. It can be seen that this blocking arrangement 68 comprises a blocking lever element 84, which extends essentially in the circumferential direction. This is supported with freedom to swivel on an end area of the pressure plate 14, so that it can swivel around an axis essentially parallel to the axis of rotation A. As a result of the circumferential offset of the center of gravity M of this blocking lever element 84 from the swivel connection of the element to the pressure plate 14, the blocking lever element 84 is pretensioned in the radially outward direction when the system is rotating, so that it has the tendency to come to rest against the inner circumferential area of the adjusting ring 36. A certain circumferential distance away from the swivel connection to the pressure plate 14, the blocking lever element 84 has a blocking lobe 86, which, when centrifugal force is acting on the element, pushes radially outward against the inner circumferential area of the adjusting ring 36. In this way, an effect is achieved again which ensures that, in the presence of centrifugal force, the adjusting ring 36 will be unable to rotate. The shape and the weight distribution of the blocking lever element 84 can be designed to ensure that, even if the rpm's exceed a certain threshold value, the frictional interaction between the blocking lobe 86 and adjusting ring 36 will still be strong enough to prevent the pretensioning force of the pretensioning spring from rotating the adjusting ring 36.

Of course, it is also possible in this embodiment to provide the adjusting ring 36 with a set of teeth, into which the blocking lobe 86 can engage, so that essentially the same functionality is obtained as that previously described. That is, when the lobe is aligned with one of the gaps between the teeth, the adjusting ring 36 will be blocked directly, and a new wear take-up adjustment is possible only after the system has been shut down again; or, in the absence of such alignment, it is possible for an adjustment to be made, but after the parts have been forced into alignment, no further adjustment can take place in a defined manner until after more wear has occurred. Conversely, it is obviously also possible, in the embodiment shown in FIGS. 6 and 7, for the interaction between the blocking element 70 and the adjusting ring 36 to be frictional in nature and not in the form of a positive connection, so that the adjusting movements will be continuous and ungraduated.

Although obvious, it should be pointed out that various changes can be made to the pressure plate assembly according to the invention. For example, two adjusting rings can be provided in the area of the wear take-up device, one of them being supported on the pressure plate, the other being acted upon by the energy-storage device. In this case, these two adjusting rings would then have bevels or ramp surfaces complementary to each other. It is also possible, of course, that a force-transmitting lever arrangement or the like, which contributes no force of its own and which must therefore cooperate with an actuating system to produce the engaging force, could be provided instead of an energy-storage device as the force-exerting arrangement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly comprising:
  a housing which can rotate about an axis of rotation;
  a pressure plate which can rotate in common with the housing about the axis of rotation and which can move axially with respect to the housing;
  a force exerting arrangement supported against the housing and the pressure plate for exerting an actuating force on the pressure plate to produce an engaged state;
  a wear take-up device between the force exerting arrangement and the pressure plate, the wear take-up device comprising at least one circumferentially moveable adjusting element and a pretensioning arrangement which pretensions the adjusting element in an adjusting direction; and
  a blocking arrangement comprising a blocking element which, as a function of centrifugal force acting on the blocking arrangement, cooperates with the adjusting element to permit or prevent movement of the adjusting element in the adjusting direction, and the blocking element being arranged on the pressure plate, wherein the blocking element is brought into blocking interaction with the adjusting element by centrifugal force, said blocking arrangement further comprising a restoring spring which acts on the blocking element to provide a restoring force urging the blocking element out of blocking interaction with the adjusting element.

2. A pressure plate assembly as in claim 1 wherein the blocking arrangement essentially prevents the adjusting element from making any movement in the adjusting direction when the centrifugal force exceeds a predetermined value.

3. A pressure plate assembly as in claim 1 wherein the blocking arrangement permits only a predetermined movement of the adjusting element in the adjusting direction when the centrifugal force exceeds a predetermined value.

4. A pressure plate assembly as in claim 1 further comprising a release distance limiting arrangement which limits axial movement of the pressure plate relative to the housing while the clutch is being disengaged, the release distance limiting arrangement allowing the pressure plate to move axially by a release distance which is essentially independent of the state of wear.

5. A pressure plate assembly as in claim 4 wherein the release distance limiting arrangement comprises:
  a stop element which is carried on the housing and which can be shifted relative to the housing by a predetermined force; and a driver element which is fixed to the pressure plate and which shifts the stop element relative to the housing after movement of the adjusting element in the adjusting direction.

6. A pressure plate assembly as in claim 1 further comprising a release force producing arrangement that produces a release force on the pressure plate in oppositin to the actuating force.

7. A pressure plate assembly as in claim 6 wherein said release force producing arrangement connects the pressure plate to the housing.

8. A pressure plate assembly as in claim 6 wherein, in the presence of said release force and said actuating force, the pretensioning arrangement does not pretension the adjusting element sufficiently to permit movement in the pretensioning direction.

9. A pressure plate assembly as in claim 1 further comprising a release distance limiting arrangement which limits movement of the force exerting arrangement while the clutch is being disengaged.

10. A pressure plate assembly as in claim 9 wherein the release distance limiting arrangement is formed by the housing.

11. A pressure plate assembly comprising:
a housing which can rotate about an axis of rotation;
a pressure plate which can rotate in common with the housing about the axis of rotation and which can move axially with respect to the housing;
a force exerting arrangement supported against the housing and the pressure plate for exerting an actuating force on the pressure plate to produce an engaged state;
a wear take-up device between the force exerting arrangement and the pressure plate, the wear take-up device comprising at least one circumferentially moveable adjusting element and a pretensioning arrangement which pretensions the adjusting element in an adjusting direction; and
a blocking arrangement comprising a blocking element which, as a function of centrifugal force acting on the blocking arrangement, cooperates with the adjusting element to permit or prevent movement of the adjusting element in the adjusting direction, and the blocking element being arranged on the pressure plate, wherein the blocking element is brought into blocking interaction with the adjusting element by centrifugal force and is brought out of blocking interaction with the adjusting element by a restoring force, wherein the restoring force is provided by gravity.

12. A pressure plate assembly comprising:
a housing which can rotate about an axis of rotation;
a pressure plate which can rotate in common with the housing about the axis of rotation and which can move axially with respect to the housing;
a force exerting arrangement supported against the housing and the pressure plate for exerting an actuating force on the pressure plate to produce an engaged state;
a wear take-up device between the force exerting arrangement and the pressure plate, the wear take-up device comprising at least one circumferentially moveable adjusting element and a pretensioning arrangement which pretensions the adjusting element in an adjusting direction;
a blocking arrangement comprising a blocking element which, as a function of centrifugal force acting on the blocking arrangement, cooperates with the adjusting element to permit or prevent movement of the adjusting element in the adjusting direction, and the blocking element being arranged on the pressure plate, wherein the blocking element is brought into blocking interaction with the adjusting element by centrifugal force and is brought out of blocking interaction with the adjusting element by a restoring force; and
a set of teeth on one of said adjusting element and said blocking element, said teeth engaging the other of said adjusting element and said blocking element to prevent movement of the adjusting element.

13. A pressure plate assembly as in claim 12 wherein said teeth on said one element engage the other element to prevent movement of the adjusting element after movement of the adjusting element in the adjusting direction.

14. A pressure plate assembly comprising:
a housing which can rotate about an axis of rotation;
a pressure plate which can rotate in common with the housing about the axis of rotation and which can move axially with respect to the housing;
a force exerting arrangement supported against the housing and the pressure plate for exerting an actuating force on the pressure plate to produce an engaged state;
a wear take-up device between the force exerting arrangement and the pressure plate, the wear take-up device comprising at least one circumferentially moveable adjusting element and a pretensioning arrangement which pretensions the adjusting element in an adjusting direction; and
a blocking arrangement comprising a blocking element which, as a function of centrifugal force acting on the blocking arrangement, cooperates with the adjusting element to permit or prevent movement of the adjusting element in the adjusting direction, and the blocking element being arranged on the pressure plate, wherein the blocking element comprises a bottom section connected to the pressure plate and at least one side piece extending axially from said bottom section, wherein a radially outer end of said side piece cooperates with the adjusting element or an element connected to the adjusting element to permit or prevent movement of the adjusting element in the adjusting direction.

15. A pressure plate assembly as in claim 14 wherein the blocking element is brought into blocking interaction with the adjusting element by centrifugal force, and is brought out of blocking interaction with the adjusting element by a restoring force.

16. A pressure plate assembly as in claim 15 wherein the blocking arrangement comprises a restoring spring which acts on the blocking element to provide the restoring force.

* * * * *